US010499322B2

United States Patent
Wang et al.

(10) Patent No.: US 10,499,322 B2
(45) Date of Patent: Dec. 3, 2019

(54) METHOD OF ANALYZING PROFILE OF WIRELESS ACCESS POINT AND EQUIPMENT UTILIZING SAME

(71) Applicant: SHANGHAI LIANSHANG NETWORK TECHNOLOGY CO., LTD., Shanghai (CN)

(72) Inventors: Qi Wang, Shanghai (CN); Hui Yang, Shanghai (CN)

(73) Assignee: SHANGHAI LIANSHANG NETWORK TECHNOLOGY CO., LTD., Shanghai (CN)

( * ) Notice: Subject to any disclaimer, the term of this patent is extended or adjusted under 35 U.S.C. 154(b) by 17 days.

(21) Appl. No.: 15/907,308

(22) Filed: Feb. 28, 2018

(65) Prior Publication Data
US 2018/0192359 A1    Jul. 5, 2018

Related U.S. Application Data

(63) Continuation of application No. PCT/CN2016/070681, filed on Jan. 12, 2016.

(30) Foreign Application Priority Data

Sep. 1, 2015    (CN) .......................... 2015 1 0551118

(51) Int. Cl.
*H04W 48/16* (2009.01)
*H04L 29/08* (2006.01)
(Continued)

(52) U.S. Cl.
CPC ............. *H04W 48/16* (2013.01); *H04L 67/30* (2013.01); *H04L 29/08918* (2013.01);
(Continued)

(58) Field of Classification Search
CPC . H04W 48/16; H04W 88/08; H04W 36/0072; H04W 36/0077;
(Continued)

(56) References Cited

U.S. PATENT DOCUMENTS 7,574,217 B1 *  8/2009  Leung ................... H04W 24/02
                                                                 455/456.1
9,078,137 B1 *  7/2015  Chechani .............. H04W 12/08
(Continued)

FOREIGN PATENT DOCUMENTS

CN    102378303 A    3/2012
CN    102547910 A    7/2012
(Continued)

*Primary Examiner* — Warner Wong
(74) *Attorney, Agent, or Firm* — Kilpatrick Townsend & Stockton LLP

(57) ABSTRACT

The present application is to provide a method and device for analyzing a profile of a wireless access point. The present application includes determining, according to access point related information, profile information about a wireless access point, by obtaining the access point related information about the wireless access point, such as historical connection related information about the wireless access point and provider related information about the wireless access point, so that the wireless access point establishes its own profile using various types of information associated therewith, thereby greatly enriching the information about the wireless access point, providing a better experience for a user of the wireless access point, and also providing a basis and premise for further associated application based on the profile information about the wireless access point at the same time.

13 Claims, 6 Drawing Sheets

(51) Int. Cl.
  *H04W 88/08* (2009.01)
  *H04W 12/00* (2009.01)
  *H04L 29/06* (2006.01)
  *H04L 29/12* (2006.01)
  *H04W 36/00* (2009.01)

(52) U.S. Cl.
  CPC ........ *H04L 61/3075* (2013.01); *H04L 63/102* (2013.01); *H04W 12/00516* (2019.01); *H04W 36/0072* (2013.01); *H04W 36/0077* (2013.01); *H04W 88/08* (2013.01)

(58) Field of Classification Search
  CPC ............. H04W 12/00516; H04L 67/30; H04L 63/102; H04L 61/3075; H04L 29/08918
  See application file for complete search history.

(56) References Cited

U.S. PATENT DOCUMENTS

| | | | | |
|---|---|---|---|---|
| 9,288,844 | B1* | 3/2016 | Akhavan-Saraf | H04W 88/10 |
| 9,882,931 | B1* | 1/2018 | Harmon | H04L 63/1483 |
| 9,985,931 | B2* | 5/2018 | Chechani | H04W 12/08 |
| 10,015,142 | B2* | 7/2018 | Chechani | H04W 12/08 |
| 2005/0050318 | A1* | 3/2005 | Alone | H04L 63/0428 713/155 |
| 2005/0071510 | A1* | 3/2005 | Belimpasakis | H04N 21/4126 709/250 |
| 2006/0264227 | A1* | 11/2006 | Takahashi | H04L 41/0806 455/513 |
| 2007/0242738 | A1* | 10/2007 | Park | H04L 47/10 375/224 |
| 2008/0176583 | A1* | 7/2008 | Brachet | G01S 5/0236 455/456.3 |
| 2009/0129354 | A1* | 5/2009 | Gupta | H04W 8/26 370/338 |
| 2010/0008258 | A1* | 1/2010 | Ji | H04W 8/26 370/254 |
| 2010/0205281 | A1* | 8/2010 | Porter | H04L 41/12 709/220 |
| 2012/0257603 | A1* | 10/2012 | Mercier | H04W 24/02 370/338 |
| 2013/0176956 | A1* | 7/2013 | Yamamoto | H04W 76/11 370/329 |
| 2014/0003263 | A1* | 1/2014 | Sheriff | H04W 36/30 370/252 |
| 2014/0003342 | A1* | 1/2014 | Sheriff | H04W 36/24 370/328 |
| 2014/0315536 | A1* | 10/2014 | Chow | H04W 8/18 455/419 |
| 2015/0085745 | A1* | 3/2015 | Atreya | H04W 16/18 370/328 |
| 2015/0095449 | A1* | 4/2015 | Kuc | H04L 12/46 709/217 |
| 2015/0139010 | A1* | 5/2015 | Jeong | H04W 48/14 370/252 |
| 2015/0271022 | A1* | 9/2015 | Seligson | H04L 12/4679 370/254 |
| 2016/0373306 | A1* | 12/2016 | Saha | H04W 4/80 |
| 2017/0142650 | A1* | 5/2017 | Wang | H04W 48/20 |
| 2018/0160365 | A1* | 6/2018 | Zhang | H04W 48/14 |
| 2019/0098481 | A1* | 3/2019 | Thota | H04W 48/16 |

FOREIGN PATENT DOCUMENTS

| | | | |
|---|---|---|---|
| CN | 104106289 A | 10/2014 | |
| CN | 104581887 A | 4/2015 | |
| CN | 104584637 A | 4/2015 | |
| EP | 1445893 A2 * | 8/2004 | ............ H04L 63/04 |

* cited by examiner

METHOD OF ANALYZING PROFILE OF WIRELESS ACCESS POINT AND EQUIPMENT UTILIZING SAME

CROSS-REFERENCES TO RELATED APPLICATIONS

This application is a continuation of International Application No. PCT/CN2016/070681, filed on Jan. 12, 2016, which claims priority to Chinese Patent Application No. 201510551118.8, filed on Sep. 1, 2015. The disclosures of the aforementioned applications are hereby incorporated by reference in their entireties.

TECHNICAL FIELD

The present invention relates to the field of computers, and in particular to a technology for analyzing a profile of a wireless access point.

BACKGROUND ART

With the continuous development of wireless local area network (WLAN) technology and the popularization of smart terminals, an increasing number of users access networks by way of a terminal device accessing a wireless access point in a wireless local area network. At present, from a wireless access point via which a terminal device accesses a network, generally the terminal device can only obtain very little related information about the wireless access point, such as SSID (Service Set Identifier) information, MAC (Media Access Control or Medium Access Control) address information, etc. about the wireless access point.

However, with the increasing popularization of the way of accessing a network via a wireless access point, within the same time and space ranges, there are also more and more wireless access points for access by users, and accordingly, diversified requirements regarding the wireless access points may be generated by the users, for example, a user needs to access the most, or the most suitable wireless access point, the user needs the wireless access point to provide commodity and service discount information about a provider of the wireless access point and so on.

At present, as an increasing number of user terminals access wireless networks via wireless access points, such problems above will also be more highlighted.

SUMMARY OF THE INVENTION

The present application may provide a method and device for analyzing a profile of a wireless access point.

According to one aspect of the present application, a method for analyzing a profile of a wireless access point is provided, wherein the method comprises:

obtaining access point related information about a wireless access point; and determining, according to the access point related information, profile information about the wireless access point.

According to another aspect of the present application, a device for analyzing a profile of a wireless access point is further provided, wherein the device comprises:

a first means for obtaining access point related information about a wireless access point; and a second means for determining, according to the access point related information, profile information about the wireless access point.

In comparison to the prior art, the present application comprises: determining, according to access point related information, profile information about a wireless access point, by obtaining the access point related information about the wireless access point, such as historical connection related information about the wireless access point and provider related information about the wireless access point, so that the wireless access point establishes its own profile using various types of information associated therewith, thereby greatly enriching the information about the wireless access point, providing a better experience for a user of the wireless access point, and also providing a basis and premise for further associated application based on the profile information about the wireless access point at the same time. For example, discount information about a commodity, service, etc. of the provider in the profile information about the wireless access point can be provided to a user who accesses the wireless access point; and wireless access points having the same characteristics can be counted by means of big data processing according to the profile information about the wireless access point.

Moreover, in the present application, an access point closer to a wireless access point, an access point having a higher SSID matching degree of the wireless access point, etc. can be taken as a reference wireless access point via information about the reference access point of the wireless access point; and the profile information about the wireless access point is adjusted, such as newly adding information contents in the profile information, modifying original information contents of the profile information, etc.; and thus the profile information about the wireless access point is supplemented, thereby making the profile information about the wireless access point more perfect, and further improving the experience of the user accessing the wireless access point.

In addition, the present application may further comprise: providing recommendation information to a corresponding user of a wireless access point according to profile information about the wireless access point, which may comprise providing historical connection attribute information about the wireless access point to a user who is to establish a wireless connection, for example, connection success rate information, connection-scanning ratio information, etc., about the wireless access point; this may also comprise providing the provider attribute information or recommendation information matching the provider attribute information to a user who accesses the wireless access point, such as position information about the wireless access point provider, service information matching the type of the provider, service or product information about the provider, feedback information about a service or product of the provider, etc.; and therefore, the experience of a user accessing a wireless access point is improved, and diversified requirements when the user accesses the wireless access point are satisfied.

BRIEF DESCRIPTION OF THE ACCOMPANYING DRAWINGS

By reading the following detailed description made with reference to the drawings for non-limiting embodiments, the other features, objectives and advantages of the present invention will become more apparent:

Figure 1:
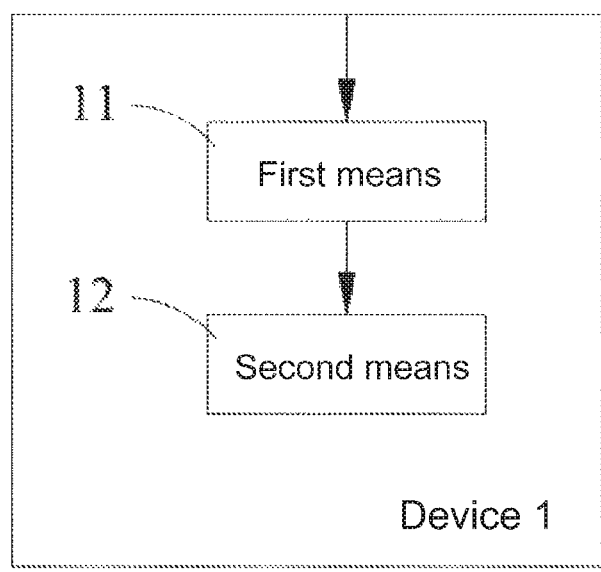
FIG. 1 shows a schematic diagram of a device of analyzing a profile of a wireless access point according to one aspect of the present application.

In the drawings, the same or similar reference signs represent the same or similar components.

DETAILED DESCRIPTION OF THE EMBODIMENTS

The present invention is hereinafter further described in detail with reference to the accompanying drawings.

In a typical configuration of the present application, a terminal, a device of a service network and a trustable party all include one or more processors (CPUs), an input/output interface, a network interface and a memory.

The memory may include a non-permanent memory, a random access memory (RAM) and/or a non-volatile memory (such as a read-only memory (ROM) or a flash memory (flash RAM)) and so on in a computer-readable medium. The memory is an example of a computer-readable medium.

The computer-readable medium comprises permanent and non-permanent, movable and non-movable media and may realize information storage by means of any method or technology. The information may be a computer-readable instruction, a data structure, a program module or other data. The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

The invention of the present application will be described below in conjunction with the accompanying drawings and embodiments.

With reference to FIG. 1, it shows a schematic diagram of a device for analyzing a profile of a wireless access point according to one aspect of the present application, wherein the device comprises a first means 11 and a second means 12, wherein the first means 11 obtains access point related information about a wireless access point; and the second means 12 determines, according to the access point related information, profile information about the wireless access point.

In one embodiment, the first means 11 obtains the access point related information about the wireless access point, wherein the related information about the access point is various types of information associated with the wireless access point, such as information about an associated SSID, MAC address, encryption mode, historical connection attribute, longitude and latitude of the position, etc. of the wireless access point, type information about a wireless access point provider, discount information about a provider commodity or service, path information about the provider, scale information about the provider, etc., and other related information about the wireless access point, wherein the first means 11 may obtain the access point related information about the wireless access point via a user equipment which accesses the wireless access point, for example, obtaining precise position information about the wireless access point via a positioning function of the user equipment, obtaining connection attribute information about the wireless access point which is submitted by a user via the user equipment, etc.; the access point related information may also be obtained by the provider of the wireless access point, such as discount information about a commodity or service of the provider, path information about the provider, etc.; and the access point related information may also be obtained via related information about a reference access point associated with the wireless access point, and the related information about the reference access point is taken as the wireless access point related information, for example, if an access point having the same SSID as the wireless access point is taken as the reference access point, provider related information about the reference access point may serve as provider related information about the wireless access point, etc.

Here, in one embodiment the method or approach of obtaining access point related information about a wireless access point by the first means 11 is merely exemplary, and the other existing or future methods or approaches of obtaining access point related information about a wireless access point, which may appear in the future, may also be included in the scope of protection of the present application as applicable to the present application and are hereby incorporated by reference.

Continuing in this embodiment, the second means 12 determines, according to the access point related information, profile information about the wireless access point. In one embodiment, the profile information about the wireless access point vividly describes various features of the wireless access point. The method for determining profile information about the wireless access point by the second means 12 includes performing processing, according to various types of related information about the wireless access point, of a corresponding mode of classification, statistics, matching, etc. according to a certain standard on the information, and obtaining information representing wireless access point related features, so as to form the profile information about the wireless access point; and at the same time, operations of adding, modification, etc. on existing profile information about a wireless access point may also be performed according to obtained new related information about the wireless access point.

Here, in one embodiment the method for determining profile information about the wireless access point by the second means 12 according to the access point related information is merely exemplary, and the other existing or future methods to determine profile information about the wireless access point according to the access point related information, which may appear in the future, may also be included in the scope of protection of the present application as applicable to the present application and are hereby incorporated by reference.

With reference to FIG. 1, preferably, the second means 12 determines, according to the access point related information and in combination with an attribute type corresponding to the access point related information, profile information about the wireless access point, and the profile information comprises profile label information corresponding to the attribute type.

In one embodiment, the second means 12 may classify and tease the access point related information about the wireless access point according to different attribute types, to further form profile label information corresponding to an attribute of the wireless access point; for example, information about the security, historical number of access people, historical number of scanning people, etc. of the wireless access point, these pieces of information may be classified as connection attributes of the wireless access point. Security level information about the wireless access point may be obtained, according to the security information about the wireless access point and a pre-set security standard, as one piece of profile label information about the wireless access point, and connection-scanning ratio information about the wireless access point may also be obtained, according to the historical number of access people and historical number of scanning people of the wireless access point, as one piece of profile label information about the wireless access point, etc. In one embodiment, the profile information about the wireless access point may comprise attribute types of a plurality of wireless access points, for example, a provider attribute of the wireless access point, a connection attribute of the wireless access point, an expansion attribute of a terminal which accesses the wireless access point, etc., and the profile information comprises profile label information corresponding to the attribute type. In one embodiment, the number of pieces of profile label information corresponding to each attribute type of the wireless access point is also not limited, which may be one or more. In one embodiment, the method for determining profile information about the wireless access point by the second means 12 may be respectively teasing access point related information about the wireless access point and classifying same into corresponding attribute types, and establishing profile information about the wireless access point. With regard to access point information in some attribute types, it is also necessary to obtain corresponding profile label information by means of statistics, matching, comparison, judgment, etc., for example, with regard to connection attribute related information about the wireless access point, profile label information about a connection success rate, connection-scanning ratio, etc. of the wireless access point may only be obtained with the need of performing statistics and calculation on frequency information about historical user scanning, access, etc.

Continuing in this embodiment, it needs to be noted here that not all the access point related information about the wireless access point is necessarily classified into a corresponding attribute type, and if access point information about a new wireless access point is obtained, while there is no corresponding attribute type in the current profile of the wireless access point, then an attribute type is newly created and added to the profile information about the wireless access point, so as to enrich the profile of the wireless access point.

Here, in one embodiment the method for determining profile information about the wireless access point by the second means 12 according to the access point related information and in combination with an attribute type corresponding to the access point related information is merely exemplary, and the other existing or future methods to determine profile information about the wireless access point according to the access point related information and in combination with an attribute type corresponding to the access point related information, which may appear in the future, may also be included in the scope of protection of the present application as applicable to the present application and are hereby incorporated by reference.

Preferably, the attribute type comprises at least any one of:

a terminal expansion attribute corresponding to the wireless access point;

a provider attribute corresponding to the wireless access point;

a historical connection attribute of the wireless access point; and other attributes of the wireless access point.

In one embodiment, the terminal expansion attribute corresponding to the wireless access point may be an attribute type corresponding to wireless access point related information which is collected and obtained by a terminal that accesses the wireless access point, such as collecting and obtaining precise position information about the wireless access point by means of the terminal, evaluation information about the security of the wireless access point which is submitted by a user via a terminal, etc.

In one embodiment, the provider attribute corresponding to the wireless access point may be an attribute type corresponding to the provider related information about the wireless access point. Here, the provider related information is associated with the type of the provider, and if the type of the provider of the wireless access point is a commercial tenant which provides a commodity/service, then the related information corresponding to the attribute type of the provider of the wireless access point may comprise information associated with the commodity/service of the provider, such as discount information about the commodity/service of the provider, evaluation information about the commodity/service, precise position information about the provider, etc.; and if the type of the wireless access point provider is a non-profit public place such as a library, a station, etc., then the related information corresponding to the attribute type of the provider of the wireless access point may comprise basic introduction information and included functional department layout conditions information about these places, such as a borrow/return place, information desk and book placing introduction of the library, emergency exit, waiting room layout, medical center of the station, etc.

In one embodiment, the historical connection attribute of the wireless access point may be an attribute type corresponding to connection performance related information about the wireless access point. Since the essential function of the wireless access point is to provide an interface for a user terminal to access a network, that is, the user terminal accesses the network by means of connecting to the wireless access point, then the connection performance of the wireless access point becomes one of the problems of the most interest of the user for the wireless access point. Here, the related information corresponding to the connection attribute of the wireless access point may comprise connection security information, available bandwidth information, connection success rate information, connection-scanning ratio information, etc. about the wireless access point.

In one embodiment, the other attributes of the wireless access point may be any other attributes associated with the wireless access point, and may also be an attribute type of a newly created wireless access point profile according to specific contents of the access point related information when there is no appropriate attribute type to be classified to, and may also be an attribute type newly created directly for the profile of the wireless access point according to specific needs, such as a coverage area of the wireless access point, and signal strength distribution conditions within the coverage, etc.

More preferably, if the attribute type corresponding to the access point related information comprises the terminal expansion attribute corresponding to the wireless access point, the second means 12 determines, according to the access point related information, position information about the wireless access point as profile label information corresponding to the terminal expansion attribute.

In this embodiment, if the attribute type corresponding to the access point related information comprises the terminal expansion attribute corresponding to the wireless access point, the second means 12 determines, according to the access point related information, position information about the wireless access point, In one embodiment, the second means 12 further calculates, by means of acquiring position information collected by a GPS (Global Positioning System) of the terminal and signal strength information about the wireless access point corresponding to the position, accurate position information about the wireless access point so as to achieve indoor positioning of the wireless access point, and more In one embodiment, the second means 12 may utilize the signal strength conditions of the wireless access point corresponding to the position collected by the GPS of the terminal, and when the signal strength is the highest, the corresponding position collected by the GPS of the terminal is the accurate position of the wireless access point; in addition, the second means 12 may also facilitate accurate positioning of the wireless access point by means of information about other surrounding wireless access points, base stations, etc. obtained by the terminal. The position information about the wireless access point then serves as profile label information corresponding to the terminal expansion attribute, and by means of the profile label information, specific indoor positioning of the wireless access point and the user terminal may be achieved, for example, specific floor information about a user in a shopping mall, or specific commercial tenant information about the shopping mall, etc. may be determined; and in this way, the most appropriate information may be pushed to the user according to specific position information about the user at this moment, such as information about a commercial tenant which has discounts and is on sale in the floor, discount information about a commercial tenant where the user is located, etc.

More preferably, if the attribute type corresponding to the access point related information comprises the historical connection attribute of the wireless access point, the profile label information corresponding to the historical connection attribute comprises at least any one of:

connection success rate information about the wireless access point; and connection-scanning ratio information about the wireless access point.

In this embodiment, if the attribute type corresponding to the access point related information comprises the historical connection attribute of the wireless access point, the profile label information corresponding to the historical connection attribute may comprise: connection success rate information about the wireless access point, and In one embodiment, the connection success rate information about the wireless access point is: a ratio value of frequency information that the user successfully accesses the wireless access point to frequency information that the user attempts to connect to the wireless access point, and this ratio value then is able to reflect one of connection performances of the corresponding wireless access point, which is also an effective rate of the wireless access point, and the frequency information that the user successfully accesses the wireless access point and the frequency information that the user attempts to connect to the wireless access point are both obtained by means of data statistics.

In this embodiment, if the attribute type corresponding to the access point related information comprises the historical connection attribute of the wireless access point, the profile label information corresponding to the historical connection attribute may also comprise: connection-scanning ratio information about the wireless access point, and In one embodiment, the connection-scanning ratio information about the wireless access point is: a ratio value of frequency information that the user attempts to connect to the wireless access point to frequency information that a user terminal has scanned the wireless access point, and this ratio value then is able to reflect one of connection performances of the corresponding wireless access point, which is also an approved rate of the wireless access point, and the frequency information that the user attempts to connect to the wireless access point and the frequency information that a user terminal has scanned the wireless access point are both obtained by means of data statistics.

In one embodiment, the profile label information corresponding to the historical connection attribute of the wireless access point above may be referred to when the user accesses the wireless access point, for example, when the user has scanned a plurality of accessible wireless access points at the same time, an access point with a higher connection success rate or approved rate may be preferentially chosen for access; and furthermore, the profile label information may also serve as a basis for recommending a wireless access point to the user, for example, when the user requests to access a wireless network, network equipment may recommend a wireless access point with a better quality for the user according to information about connection success rates, approved rates, etc. of a plurality of wireless access points near the user terminal, so that the user terminal implements network connection as soon as possible, so as to improve user experience.

Figure 2:
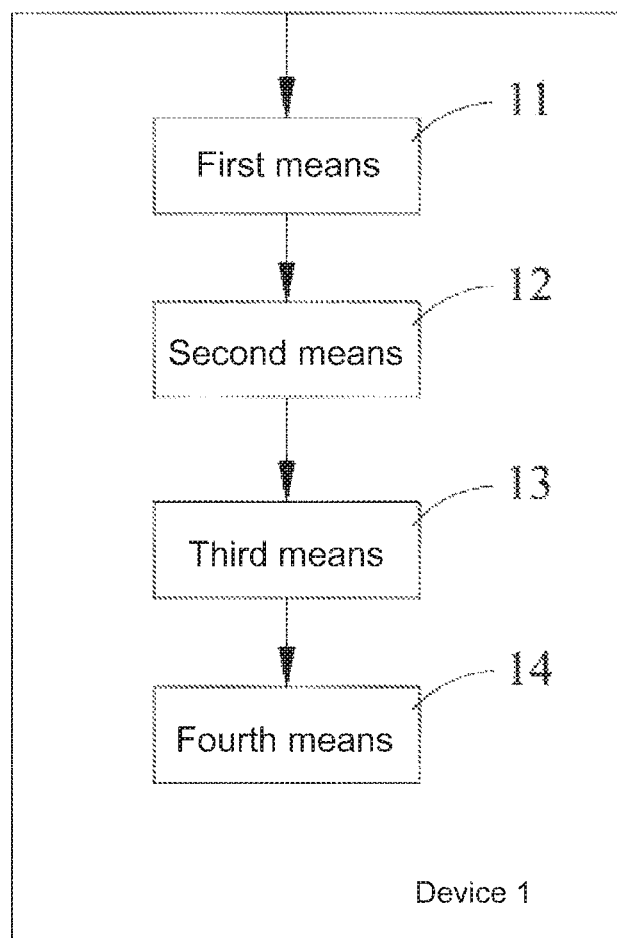
FIG. 2 shows a schematic diagram of a device of analyzing a profile of a wireless access point according to one embodiment of the present application.

With reference to FIG. 2, preferably, the device further comprises a third means 13 and a fourth means 14, and the third means 13 determines, according to the profile information, one or more reference access points corresponding to the wireless access point; and the fourth means 14 performs, according to at least one reference access point of the one or more reference access points, an adjustment operation on the profile information.

In this embodiment, the third means 13 of the device determines, according to the profile information, one or more reference access points corresponding to the wireless access point. In one embodiment, the third means 13 may determine, according to specific conditions, and related information in the profile information about the wireless access point, a reference access point of the wireless access point. For example, accurate position information about the wireless access point may be determined according to profile label information corresponding to a terminal expansion attribute in the profile information about the wireless access point, and wireless access points within a certain distance of the position may be further determined as reference access points, etc., and an access point having the same SSID as the wireless access point may also serve as the reference access point, etc.

Here, in one embodiment the method for determining one or more reference access points corresponding to the wireless access point by the third means 13 according to the profile information is merely exemplary, and the other existing or future methods to determine one or more reference access points corresponding to the wireless access point according to the profile information, which may appear in the future, may also be included in the scope of protection of the present application as applicable to the present application and are hereby incorporated by reference.

In this embodiment, the fourth means 14 performs, according to at least one reference access point of the one or more reference access points, an adjustment operation on the profile information. In one embodiment, the fourth means 14 may enrich, according to related information about the reference access point(s) of the wireless access point, the profile of the wireless access point, and to serve as a distance rather than limitation, the fourth means 14 may supplement provider information about the wireless access point according to provider related information about the wireless access point(s); and In one embodiment, an associated adjustment operation may be performed on the provider information about the wireless access point according to the provider information about the reference access point(s) of the wireless access point through the fact that provider information corresponding to wireless access points which are close in position and distance may also be similar or the same. Certainly, the fourth means 14 may further enrich, according to other related information about the reference access point(s), the profile information about the wireless access point, which will not be taken as examples one by one.

Continuing in this embodiment, the specific method for performing an adjustment operation on the profile information by the fourth means 14 may be newly adding profile information about the wireless access point. For example, when the wireless access point profile information lacks the provider information, the provider information about a reference access point near the position of the wireless access point may serve as the provider information about the wireless access point, so as to further add a provider attribute type corresponding to the provider information to the profile information about the wireless access point; the method may also be modifying the profile information about the wireless access point, for example, when the profile information about the wireless access point changes, an adjustment operation of modification or update, etc. needs to be performed on the profile information about the wireless access point; and the method may further comprise adding provider scale information about the wireless access point according to the quantity information about the reference access points of the wireless access point, and here, the provider scale information about the wireless access point may be obtained by counting quantity information about access points having the same SSID as the wireless access point, i.e., reference access points, and the information is added to the profile information about the wireless access point.

Here, in one embodiment the method for performing an adjustment operation on the profile information by the second means 14 according to at least one reference access point of the one or more reference access points is merely exemplary, and the other existing or future methods to perform an adjustment operation on the profile information according to at least one reference access point of the one or more reference access points, which may appear in the future, may also be included in the scope of protection of the present application as applicable to the present application and are hereby incorporated by reference.

Preferably, the adjustment operation comprises at least any one of:

newly adding information contents in the profile information according to reference profile information about the at least one reference access point;

modifying original information contents in the profile information according to the reference profile information about the at least one reference access point; and newly adding provider scale information corresponding to the wireless access point in the profile information according to quantity information about the at least one reference access point.

In this embodiment, the adjustment operation may comprise newly adding information contents in the profile information according to reference profile information about the at least one reference access point. In one embodiment, newly adding information contents in the profile information is generally newly adding contents which have not appeared in the wireless access point profile information, and at this time the newly added information contents supplement the profile information about the wireless access point, so that the profile information about the wireless access point is richer. Please refer to the aforementioned embodiments for the examples of newly adding profile information contents, which will not be described herein.

Continuing in this embodiment, the adjustment operation may further comprise modifying the original information contents in the profile information according to reference profile information about the at least one reference access point. In one embodiment, modifying the original information contents in the profile information is generally the case where the profile information about the wireless access point changes, for example, in the case where the profile information about the wireless access point changes, an adjustment operation of modification or update, etc. needs to be performed on the profile information about the wireless access point; and at this time, the profile information about the wireless access point needs to be modified or updated in a targeted manner, so as to ensure that the profile information about the wireless access point represents current feature information about the wireless access point and is more accurate and trustable.

Continuing in this embodiment, the adjustment operation may further comprise newly adding provider scale information corresponding to the wireless access point to the profile information according to the quantity information about the at least one reference access point, which may specifically be adding the provider scale information about the wireless access point according to the quantity information about the reference access points of the wireless access point. Here, the provider scale information about the wireless access point may be obtained by counting quantity information about access points having the same SSID as the wireless access point, i.e., reference access points, and the information is added to the profile information about the wireless access point, so as to enrich the profile information about the wireless access point.

Preferably, the second means 12 comprises a second device one (not shown) and a second device two (not shown), and the second device one determines, according to the access point related information, one or more reference access points corresponding to the wireless access point; and the second device two determines, according to the reference profile information about at least one reference access point of the one or more reference access points, profile information about the wireless access point.

In this embodiment, the second device one of the second means 12 determines, according to the access point related information, one or more reference access points corresponding to the wireless access point. In one embodiment, the second device one may determine, according to specific conditions and related information in the profile information about the wireless access point, a reference access point of the wireless access point. For example, accurate position information about the wireless access point may be determined according to profile label information corresponding to a terminal expansion attribute in the profile information about the wireless access point, and wireless access points within a certain distance of the position may be further determined as reference access points, etc., and an access point having the same SSID as the wireless access point may also serve as the reference access point, etc.

Here, in one embodiment the method for determining one or more reference access points corresponding to the wireless access point by the second device one according to the profile information is merely exemplary, and the other existing or future methods to determine one or more reference access points corresponding to the wireless access point according to the profile information, which may appear in the future, may also be included in the scope of protection of the present application as applicable to the present application and are hereby incorporated by reference.

Continuing in this embodiment, the second device two determines, according to the reference profile information about at least one reference access point of the one or more reference access points, profile information about the wireless access point. In one embodiment, the method for determining the profile information about the wireless access point by the second device two according to the profile information about the reference access point determined by the second device one may be directly matching the profile information about the reference access point as the profile information about the wireless access point. This case is mainly targeted at the situation where the similarity between the reference access point and the wireless access point is relatively high, for example, the profile information between wireless access points having the same SSID within a certain distance range may be matched with each other, etc.; also, certain information in the profile information about the reference access point may serve as a supplement of the profile information about the wireless access point. This case is mainly targeted at the situation where the profile information in the wireless access point is not so perfect and corresponding information about the profile information about the reference access point needs to be supplemented. For example, provider type information about access points within a certain distance range of the wireless access point may be used to supplement provider type information in the profile information about the wireless access point, etc.; and also, certain information in the profile information about the reference access point may serve as a basis for modifying or updating the original profile information about the wireless access point.

In addition, the second device two may further newly add the profile information about the wireless access point by performing processing of statistics, matching, etc. on the associated data of the reference access point of the wireless access point. For example, the provider scale information about the wireless access point may be obtained by counting quantity information about access points having the same SSID as the wireless access point, i.e., reference access points, and the information is added to the profile information about the wireless access point, so as to enrich the profile information about the wireless access point, etc.

In an embodiment, the reference access point satisfies at least any one of the conditions of:

the distance between the reference access point and the wireless access point being less than a pre-determined access point distance threshold value;

a matching degree between an adjacent access point of the reference access point and an adjacent access point of the wireless access point exceeding a pre-determined adjacent access point matching threshold value;

an SSID matching degree between the reference access point and the wireless access point exceeding a pre-determined identifier matching threshold value;

access frequency information about the same user equipment accessing the reference access point and the wireless access point exceeding a pre-determined common user number threshold value; and different user equipment accessing the reference access point and the wireless access point, and a matching degree between user profile information about users corresponding to different user equipment exceeds a pre-set user profile information matching threshold value.

In this embodiment, the reference access point may satisfy: the distance between the reference access point and the wireless access point being less than a pre-determined access point distance threshold value; In one embodiment, with regard to the distance information between the reference access point and the wireless access point, the distance information between the reference access point and the wireless access point may be calculated after position information between the reference access point and the wireless access point is determined, Moreover, the position information about the reference access point and that of the wireless access point may be respectively obtained directly by means of position information about a corresponding access point in the profile information about the reference access point and that of the wireless access point, and the position information about the two may also be obtained respectively by means of a terminal accessing the reference access point and the wireless access point. Furthermore, accurate position information about the wireless access point is determined by means of GPS positioning of the terminal and the signal strength of the corresponding wireless access point, etc., and the distance threshold value needs to be set according to specific conditions. For example, the passenger flow volume near the wireless access point and the distribution density of wireless access points, etc. may be taken into consideration. The threshold value should not be too great to avoid too many reference access points of the wireless access point, which may thus affect the accuracy of profile information about the wireless access point; and the threshold value should also not be too small to avoid being unable to find a reference access point of the wireless access point, such that the objective of enriching the profile information about the wireless access point via profile information about the reference access point cannot be achieved.

Continuing in this embodiment, the reference access point may satisfy: a matching degree between an adjacent access point of the reference access point and an adjacent access point of the wireless access point exceeding a pre-determined adjacent access point matching threshold value; and In one embodiment, an adjacent access point of the reference access point and an adjacent access point of the wireless access point may both be judged and determined according to position information about an access point, and please refer to the aforementioned embodiments for the specific implementation of obtaining the position information about the wireless access point and calculating the distance between access points according to the position information, which will not be described herein. Here, the matching degree between adjacent access points respectively corresponding to the reference access point and the wireless access point may be the matching degree of profile information about the adjacent access points, and the setting of the threshold value also needs to be decided according to specific conditions, and the setting principle thereof is similar to the setting principle of the distance threshold value above, which will not be described herein.

Continuing in this embodiment, the reference access point may satisfy: an SSID matching degree between the reference access point and the wireless access point exceeding a pre-determined identifier matching threshold value; and In one embodiment, when an SSID matching degree of the wireless access points is relatively high, it represents, to some extent, that providers of these wireless access points may possibly be the same, for example, if the SSIDs of the wireless access points are all called "Starbucks Coffee" or some are "Starbucks" while some are "Starbucks Coffee", then it is of great possibility that the providers of these wireless access points are all Starbucks Coffee Store. Here, the setting of an identification matching threshold value may take the situations of the length of SSID, whether a key identification content is comprised, etc. into consideration. For example, if the SSID of a wireless access point is "Starbucks Coffee", then it may be the case where "Starbucks" therein is a key content of a provider commercial tenant name, while "Coffee" is a provider type key content, etc.

Continuing in this embodiment, the reference access point may satisfy: access frequency information about the same user equipment accessing the reference access point and the wireless access point exceeding a pre-determined common user number threshold value; In one embodiment, the same user equipment which accesses the reference access point and the wireless access point is a common user equipment of the reference access point and the wireless access point; and frequency information that the same user equipment accesses the reference access point and the wireless access point may represent, to some extent, the number of common users of the reference access point and the wireless access point. For this reason, when the frequency information that the same user equipment accesses the reference access point and the wireless access point exceeds a threshold value of the number of common users of the reference access point and the wireless access point, the profile information about the corresponding reference access point may then serve as reference profile information about the wireless access point, so as to enrich the profile information about the wireless access point. Furthermore, access frequency information that the same user equipment accesses the reference access point and the wireless access point may be obtained via a historical record that the user equipment accesses the wireless access point, and may also be obtained via log record information that the wireless access point is accessed, etc., and the setting of the threshold value of the number of common users also needs to be decided according to specific conditions, and the setting principle thereof is similar to the setting principle of the distance threshold value and matching threshold value above, which will not be described herein.

Continuing in this embodiment, the reference access point may satisfy: different user equipment accessing the reference access point and the wireless access point, and the matching degree between pieces of user profile information about users corresponding to different user equipment exceeds a pre-set user profile information matching threshold value, and the user profile information is information representing various features of a user, for example, information about the user's character, specialty, interest and hobby, etc., and when the matching degree of different pieces of user profile information exceeds a certain pre-set threshold value, it represents, to some extent, that users corresponding to the different user profiles have many identical features, for example, having the same interest and hobby, specialty, etc., then furthermore, the users having many identical features may also have some similarity in wireless access points accessed by a user equipment. In one embodiment, when the interests of different users with the matching degree of user profile information exceeding a certain threshold value are similar, the different users may generally access wireless access points having similar features, and at this time, other wireless access points accessed by the different users with the matching degree of profile information exceeding a certain threshold value may be taken as reference access points, and the overall features of these reference access points are used for enriching the profile information about the wireless access point. For example, if a user A and a user B both prefer delicious food, and providers of wireless access points accessed thereby being delicious food or associated with delicious food will be more when the matching degree of user profile information about the two exceeds a certain matching degree threshold value, then from the perspective of the wireless access points accessed by the user A and the user B being both basically wireless access points associated with delicious food, the wireless access points in the access historical record of the two may be taken as reference access points, and the overall feature, i.e., the access point related information "the provider being a food and beverage commercial tenant", is used for enriching the profile information about the wireless access point, and the setting of the matching threshold value of the user profile information also needs to be decided according to specific conditions, and the setting principle thereof is similar to the setting principle of the distance threshold value, adjacent access point matching threshold value and threshold value of the number of common users above, which will not be described herein.

Preferably, if the reference access point satisfies the condition of different user equipment accessing the reference access point and the wireless access point, and the matching degree between pieces of user profile information about users corresponding to the different user equipment exceeds a pre-set user profile information matching threshold value, the second device two:

determines, according to reference profile information about the reference access point which satisfies the condition, profile information about the wireless access point.

In one embodiment, please refer to corresponding description in the aforementioned embodiments for the specific implementation of satisfying conditions of the reference access point, which will not be described herein. The second device two determines, according to reference profile information about the reference access point which satisfies the aforementioned condition, profile information about the wireless access point. In one embodiment, when the interests of different users with the matching degree of user profile information exceeding a certain threshold value are similar, the different users may generally access wireless access points having similar features, and at this time, other wireless access points accessed by the different users with the matching degree of profile information exceeding a certain threshold value may be taken as reference access points, and the second device two may use the overall feature of these reference access points for enriching the profile information about the wireless access point. For example, if a user A and a user B both prefer delicious food, and providers of wireless access points accessed thereby being delicious food or associated with delicious food will be more when the matching degree of user profile information about the two exceeds a certain matching degree threshold value, then from the perspective of the wireless access points accessed by the user A and the user B being both basically wireless access points associated with delicious food, the wireless access points in the access historical record of the two may be taken as reference access points, and the overall feature, i.e., the access point related information "the provider being a food and beverage commercial tenant", is used for enriching the profile information about the wireless access point.

Here, in one embodiment the method for determining, by the second device two, profile information about the wireless access point according to the reference profile information about at least one reference access point of the one or more reference access points is merely exemplary, and the other existing or future methods to determine profile information about the wireless access point according to the reference profile information about at least one reference access point of the one or more reference access points, which may appear in the future, may also be included in the scope of protection of the present application as applicable to the present application and are hereby incorporated by reference.

Figure 3:
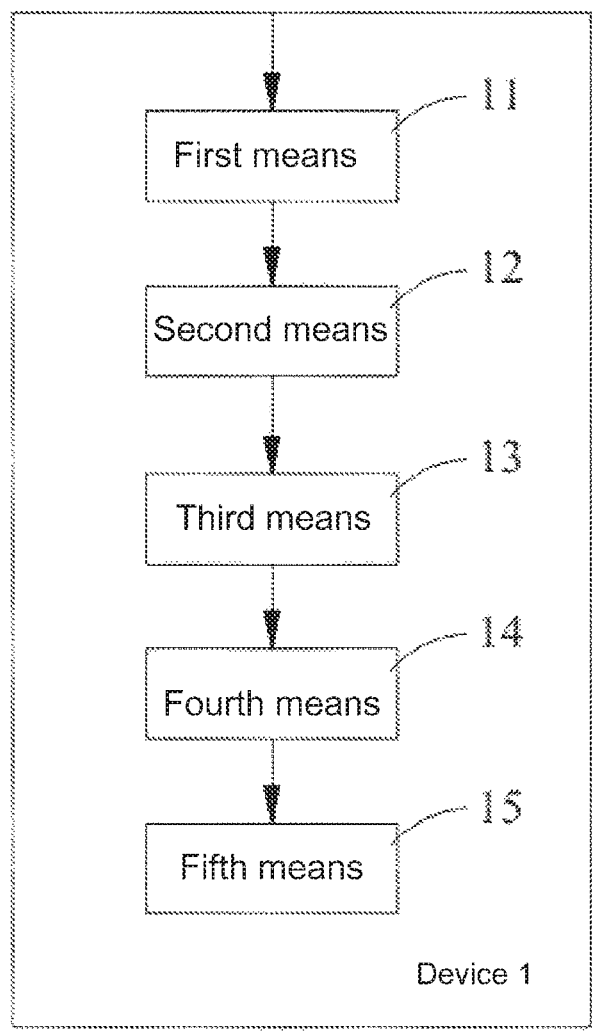
FIG. 3 shows a schematic diagram of a device of analyzing a profile of a wireless access point according to another embodiment of the present application.

In an embodiment (with reference to FIG. 3), the device 1 further comprises a fifth means 15, and the fifth means 15 provides, according to the profile information, recommendation information to a corresponding user of the wireless access point.

In this embodiment, the fifth means 15 provides, according to the profile information, recommendation information to a corresponding user of the wireless access point. In one embodiment, in the overall process starting from a user sending the wish of accessing a network via the wireless access point, until the user is in a state where the network is accessed via the wireless access point, the fifth means 15 may recommend information to the user according to the profile information about the wireless access point, and the information recommended thereby may be directly from the profile information about the wireless access point, and may also be information obtained according to statistics and matching of associated information in the associated wireless access point profile information, for example, by counting information about the number of wireless access points having the same SSID, scale conditions information about the commercial tenant, etc. that may be recommended to the user.

Continuing in this embodiment, furthermore, when the user chooses a wireless access point to access the network, the fifth means 15 may recommend, according to specific usage scenarios of the user, such as Internet banking payment, video watching, etc., as well as connection attribute information in the profile information about the wireless access point, the most appropriate wireless access point to the user, for example, it may be correspondingly a wireless access point with a relatively high security level, with a relatively broad bandwidth, etc. After the user accesses the network via the wireless access point, the fifth means 15 may recommend, according to provider related information in the profile information about the wireless access point accessed by the user, associated information to the user, for example, when the provider of the wireless access point is a commercial tenant, commodity/service information about the commercial tenant as well as discount information thereabout may be recommended to the user; and when the provider of the wireless access point is a station or a library, information about layout conditions, medical center positions, etc. of the place may be recommended to the user.

Preferably, the fifth means comprises a fifth device one (not shown) or a fifth device two (not shown), and when the profile information comprises historical connection attribute information about the wireless access point, the fifth device one provides the historical connection attribute information to a user who is to establish a wireless connection; and when the profile information comprises provider attribute information corresponding to the wireless access point, the fifth device two provides the provider attribute information or recommendation information matching the provider attribute information to a user who accesses the wireless access point.

In this embodiment, when the profile information comprises historical connection attribute information about the wireless access point, the fifth device one provides the historical connection attribute information to a user who is to establish a wireless connection. In one embodiment, the historical connection attribute information which may be provided by the fifth device one to the user may generally comprise information about the access security, connection success rate, scanning connection ratio, available bandwidth, connection related complaint conditions, etc. of the wireless access point, and the user may choose an appropriate or the best wireless access point according to these pieces of information and further access the network; furthermore, when the user chooses a wireless access point to access the network, the fifth means 15 may recommend, according to specific usage scenarios of the user, such as Internet banking payment, video watching, etc., as well as connection attribute information in the profile information about the wireless access point, the most appropriate wireless access point to the user, for example, it may be correspondingly a wireless access point with a relatively high security level, with a relatively broad bandwidth, etc.

Continuing in this embodiment, when the profile information comprises provider attribute information corresponding to the wireless access point, the fifth device two provides the provider attribute information or recommendation information matching the provider attribute information to a user who accesses the wireless access point. In one embodiment, the fifth device two may recommend, according to provider related information in the profile information about the wireless access point accessed by the user, associated information to the user, for example, when the provider of the wireless access point is a commercial tenant, commodity/service information about the commercial tenant as well as discount information thereabout may be recommended to the user; and when the provider of the wireless access point is a station or a library, information about layout conditions, medical center positions, etc. of the place may be recommended to the user.

More preferably, the recommendation information matching the provider attribute information comprises at least any one of:

position information about a provider corresponding to the wireless access point;

service information matching the type of the provider; service or product information about the provider; and feedback information about a service or product of the provider.

In one embodiment, the recommendation information matching the provider attribute information may comprise position information about a provider corresponding to the wireless access point, and the position information may be specific position information about the provider, may also be position information about the provider with reference to a certain famous landmark, and may also be path information for arriving at the position of the provider, etc.

In one embodiment, the recommendation information matching the provider attribute information may also comprise service information matching the type of the provider, and the type of the provider may comprise commercial tenants of food and beverage, clothes, entertainment, etc., public places of a station, a library, etc., office places of an office building, etc.; and the service information matching these provider types above generally comprises service information about parking, discount, delivery to home or not, etc. of a commercial tenant, service information about functional department layout conditions, information center, emergency medical center, etc. of public places of a station, a library, etc.

In one embodiment, the recommendation information matching the provider attribute information may also comprise service or product information about the provider, and the service or product information about the provider is generally discount activities of a product/service thereof, information about a new arrival product/service, etc., that may be recommended to a user in the case where the provider is a commercial tenant.

In one embodiment, the recommendation information matching the provider attribute information may also comprise feedback information about a service or product of the provider, and the feedback information about the service or product of the provider is generally also feedback and comment information, from a user who has purchased/experienced the product/service of the provider, about the purchased/experienced product/service in the case where the provider is a commercial tenant, since these information has some reference values for other users who wish to purchase/experience the product/service of the provider. These information may be recommended to users.

In comparison to the prior art, the present application comprises: determining, according to access point related information, profile information about a wireless access point, by obtaining the access point related information about the wireless access point, such as historical connection related information about the wireless access point and provider related information about the wireless access point, so that the wireless access point establishes its own profile using various types of information associated therewith, thereby greatly enriching the information about the wireless access point, providing a better experience for a user of the wireless access point, and also providing a basis and premise for further associated application based on the profile information about the wireless access point at the same time. For example, discount information about a commodity, service, etc. of the provider in the profile information about the wireless access point can be provided to a user who accesses the wireless access point; and wireless access points having the same characteristics can be counted by means of big data processing according to the profile information about the wireless access point.

Moreover, in the present application, an access point closer to a wireless access point, an access point having a higher SSID matching degree of the wireless access point, etc. can be taken as a reference wireless access point via information about the reference access point of the wireless access point; and the profile information about the wireless access point is adjusted, such as newly adding information contents in the profile information, modifying original information contents of the profile information, etc.; and thus the profile information about the wireless access point is supplemented, thereby making the profile information about the wireless access point more perfect, and further improving the experience of the user accessing the wireless access point.

In addition, the present application may further comprise: providing recommendation information to a corresponding user of a wireless access point according to profile information about the wireless access point, which may comprise providing historical connection attribute information about the wireless access point to a user who is to establish a wireless connection, for example, connection success rate information, connection-scanning ratio information, etc., about the wireless access point; this may also comprise providing the provider attribute information or recommendation information matching the provider attribute information to a user who accesses the wireless access point, such as position information about the wireless access point provider, service information matching the type of the provider, service or product information about the provider, feedback information about a service or product of the provider, etc.; and therefore, the experience of a user accessing a wireless access point is improved, and diversified requirements when the user accesses the wireless access point are satisfied.

Figure 4:
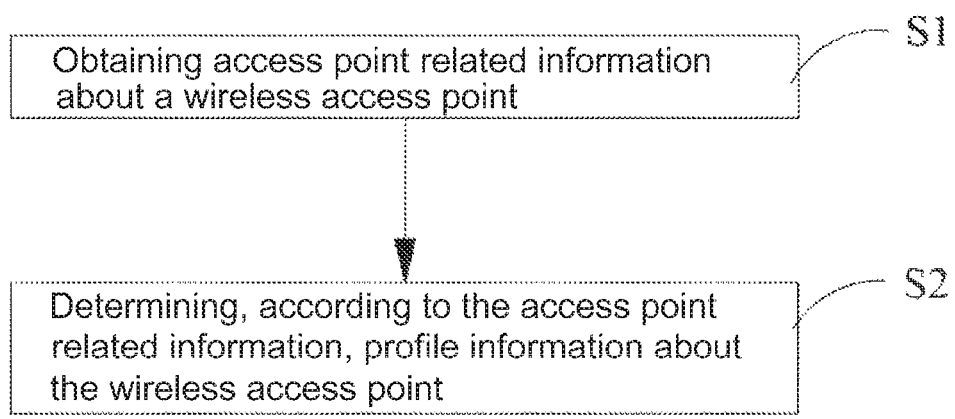
FIG. 4 shows a flowchart of a method for analyzing a profile of a wireless access point according to another aspect of the present application.

With reference to FIG. 4, it shows a flowchart of method for analyzing a profile of a wireless access point provided according to one aspect of the present application, and the method comprises:

S1, obtaining access point related information about a wireless access point; and S2, determining, according to the access point related information, profile information about the wireless access point.

In one embodiment, in step S1, the access point related information about the wireless access point is obtained, and the related information about the access point is various information associated with the wireless access point, such as information about an associated SSID, MAC address, encryption mode, historical connection attribute, longitude and latitude of the position, etc. of the wireless access point, type information about a wireless access point provider, discount information about a provider commodity or service, path information about the provider, scale information about the provider, etc., and other related information about the wireless access point, and in step S1, the access point related information about the wireless access point is obtained via a user equipment which accesses the wireless access point, for example, obtaining precise position information about the wireless access point via a positioning function of the user equipment, obtaining connection attribute information about the wireless access point which is submitted by a user via the user equipment, etc.; the access point related information may also be obtained by the provider of the wireless access point, such as discount information about a commodity or service of the provider, path information about the provider, etc.; and the access point related information may also be obtained via related information about a reference access point associated with the wireless access point, and the related information about the reference access point is taken as the wireless access point related information, for example, if an access point having the same SSID as the wireless access point is taken as the reference access point, provider related information about the reference access point may serve as provider related information about the wireless access point, etc.

Here, in one embodiment the method or approach of obtaining access point related information about a wireless access point in step S1 is merely exemplary, and the other existing or future methods or approaches of obtaining access point related information about a wireless access point, which may appear in the future, may also be included in the scope of protection of the present application as applicable to the present application and are hereby incorporated by reference.

Continuing in this embodiment, in step S2, according to the access point related information, profile information about the wireless access point is determined. In one embodiment, the profile information about the wireless access point vividly describes various features of the wireless access point. In one embodiment, the method for determining profile information about the wireless access point comprises: performing processing, according to various types of related information about the wireless access point, of a corresponding mode of classification, statistics, matching, etc. according to a certain standard on the information, and obtaining information representing wireless access point related features, so as to form the profile information about the wireless access point; and at the same time, operations of adding, modification, etc. on existing profile information about a wireless access point may also be performed according to obtained new related information about the wireless access point.

Here, in one embodiment the method in step S2 for determining profile information about the wireless access point according to the access point related information is merely exemplary, and the other existing or future methods to determine profile information about the wireless access point according to the access point related information, which may appear in the future, may also be included in the scope of protection of the present application as applicable to the present application and are hereby incorporated by reference.

Preferably, step S2 comprises:

determining, according to the access point related information and in combination with an attribute type corresponding to the access point related information, profile information about the wireless access point, and the profile information comprises profile label information corresponding to the attribute type.

In one embodiment, in step S2, the access point related information about the wireless access point may be classified and teased according to different attribute types, to further form profile label information corresponding to an attribute of the wireless access point; for example, information about the security, historical number of access people, historical number of scanning people, etc. of the wireless access point, these pieces of information may be classified as connection attributes of the wireless access point. Security level information about the wireless access point may be obtained, according to the security information about the wireless access point and a pre-set security standard, as one piece of profile label information about the wireless access point, and connection-scanning ratio information about the wireless access point may also be obtained, according to the historical number of access people and historical number of scanning people of the wireless access point, as one piece of profile label information about the wireless access point, etc. In one embodiment, the profile information about the wireless access point may comprise attribute types of a plurality of wireless access points, for example, a provider attribute of the wireless access point, a connection attribute of the wireless access point, an expansion attribute of a terminal which accesses the wireless access point, etc., and the profile information comprises profile label information corresponding to the attribute type. In one embodiment, the number of pieces of profile label information corresponding to each attribute type of the wireless access point is also not limited, which may be one or more. In one embodiment, the method in step S2 for determining profile information about the wireless access point may be respectively teasing access point related information about the wireless access point and classifying same into corresponding attribute types, and establishing profile information about the wireless access point. With regard to access point information in some attribute types, it is also necessary to obtain corresponding profile label information by means of statistics, matching, comparison, judgment, etc., for example, with regard to connection attribute related information about the wireless access point, profile label information about a connection success rate, connection-scanning ratio, etc. of the wireless access point may only be obtained with the need of performing statistics and calculation on frequency information about historical user scanning, access, etc.

Continuing in this embodiment, it needs to be noted here that not all the access point related information about the wireless access point is necessarily classified into a corresponding attribute type, and if access point information about a new wireless access point is obtained, while there is no corresponding attribute type in the current profile of the wireless access point, then an attribute type is newly created and added to the profile information about the wireless access point, so as to enrich the profile of the wireless access point.

Here, in one embodiment the method in step S2 for determining profile information about the wireless access point according to the access point related information and in combination with an attribute type corresponding to the access point related information is merely exemplary, and the other existing or future methods to determine profile information about the wireless access point according to the access point related information and in combination with an attribute type corresponding to the access point related information, which may appear in the future, may also be included in the scope of protection of the present application as applicable to the present application and are hereby incorporated by reference.

Preferably, the attribute type comprises at least any one of:

a terminal expansion attribute corresponding to the wireless access point;

a provider attribute corresponding to the wireless access point;

a historical connection attribute of the wireless access point; and other attributes of the wireless access point.

In one embodiment, the terminal expansion attribute corresponding to the wireless access point may be an attribute type corresponding to wireless access point related information which is collected and obtained by a terminal that accesses the wireless access point, such as collecting and obtaining precise position information about the wireless access point by means of the terminal, evaluation information about the security of the wireless access point which is submitted by a user via a terminal, etc.

In one embodiment, the provider attribute corresponding to the wireless access point may be an attribute type corresponding to the provider related information about the wireless access point. Here, the provider related information is associated with the type of the provider, and if the type of the provider of the wireless access point is a commercial tenant which provides a commodity/service, then the related information corresponding to the attribute type of the provider of the wireless access point may comprise information associated with the commodity/service of the provider, such as discount information about the commodity/service of the provider, evaluation information about the commodity/service, precise position information about the provider, etc.; and if the type of the wireless access point provider is a non-profit public place such as a library, a station, etc., then the related information corresponding to the attribute type of the provider of the wireless access point may comprise basic introduction information and included functional department layout conditions information about these places, such as a borrow/return place, information desk and book placing introduction of the library, emergency exit, waiting room layout, medical center of the station, etc.

In one embodiment, the historical connection attribute of the wireless access point may be an attribute type corresponding to connection performance related information about the wireless access point. Since the essential function of the wireless access point is to provide an interface for a user terminal to access a network, that is, the user terminal accesses the network by means of connecting to the wireless access point, then the connection performance of the wireless access point becomes one of the problems of the most interest of the user for the wireless access point. Here, the related information corresponding to the connection attribute of the wireless access point may comprise connection security information, available bandwidth information, connection success rate information, connection-scanning ratio information, etc. about the wireless access point.

In one embodiment, the other attributes of the wireless access point may be any other attributes associated with the wireless access point, and may also be an attribute type of a newly created wireless access point profile according to specific contents of the access point related information when there is no appropriate attribute type to be classified to, and may also be an attribute type newly created directly for the wireless access point according to specific needs, such as a coverage area of the wireless access point, and signal strength distribution conditions within the coverage, etc.

More preferably, step S2 further comprises:

if the attribute type corresponding to the access point related information comprises the terminal expansion attribute corresponding to the wireless access point, determining, according to the access point related information, position information about the wireless access point as profile label information corresponding to the terminal expansion attribute.

In this embodiment, if the attribute type corresponding to the access point related information comprises the terminal expansion attribute corresponding to the wireless access point, in step S2, according to the access point related information, position information about the wireless access point is determined. In one embodiment, according to position information collected by a GPS of the terminal, and signal strength information about the wireless access point corresponding to the position, accurate position information about the wireless access point is further calculated to achieve indoor positioning of the wireless access point. More In one embodiment, in step S2, the signal strength conditions of the wireless access point corresponding to the position collected by the GPS of the terminal may be utilized, and when the signal strength is the highest, the corresponding position collected by the GPS of the terminal is the accurate position of the wireless access point. Here, in step S2, accurate positioning of the wireless access point may also be facilitated by means of information about other surrounding wireless access points, base stations, etc. obtained by the terminal. The position information about the wireless access point then serves as profile label information corresponding to the terminal expansion attribute, and by means of the profile label information, specific indoor positioning of the wireless access point and the user terminal may be achieved, for example, specific floor information about a user in a shopping mall, or specific commercial tenant information about the shopping mall, etc. may be determined; and in this way, the most appropriate information may be pushed to the user according to specific position information about the user at this moment, such as information about a commercial tenant which has discounts and is on sale in the floor, discount information about a commercial tenant where the user is located, etc.

More preferably, if the attribute type corresponding to the access point related information comprises the historical connection attribute of the wireless access point, the profile label information corresponding to the historical connection attribute comprises at least any one of:

connection success rate information about the wireless access point; and connection-scanning ratio information about the wireless access point.

In this embodiment, if the attribute type corresponding to the access point related information comprises the historical connection attribute of the wireless access point, the profile label information corresponding to the historical connection attribute may comprise: connection success rate information about the wireless access point, and In one embodiment, the connection success rate information about the wireless access point is: a ratio value of frequency information that the user successfully accesses the wireless access point to frequency information that the user attempts to connect to the wireless access point, and this ratio value then is able to reflect one of connection performances of the corresponding wireless access point, which is also an effective rate of the wireless access point, and the frequency information that the user successfully accesses the wireless access point and the frequency information that the user attempts to connect to the wireless access point are both obtained by means of data statistics.

In this embodiment, if the attribute type corresponding to the access point related information comprises the historical connection attribute of the wireless access point, the profile label information corresponding to the historical connection attribute may also comprise: connection-scanning ratio information about the wireless access point, and In one embodiment, the connection-scanning ratio information about the wireless access point is: a ratio value of frequency information that the user attempts to connect to the wireless access point to frequency information that a user terminal has scanned the wireless access point, and this ratio value then is able to reflect one of connection performances of the corresponding wireless access point, which is also an approved rate of the wireless access point, and the frequency information that the user attempts to connect to the wireless access point and the frequency information that a user terminal has scanned the wireless access point are both obtained by means of data statistics.

In one embodiment, the profile label information corresponding to the historical connection attribute of the wireless access point above may be referred to when the user accesses the wireless access point, for example, when the user has scanned a plurality of accessible wireless access points at the same time, an access point with a higher connection success rate or approved rate may be preferentially chosen for access; and furthermore, the profile label information may also serve as a basis for recommending a wireless access point to the user, for example, when the user requests to access a wireless network, network equipment may recommend a wireless access point with a better quality for the user according to information about connection success rates, approved rates, etc. of a plurality of wireless access points near the user terminal, so that the user terminal implements network connection as soon as possible, so as to improve user experience.

Figure 5:
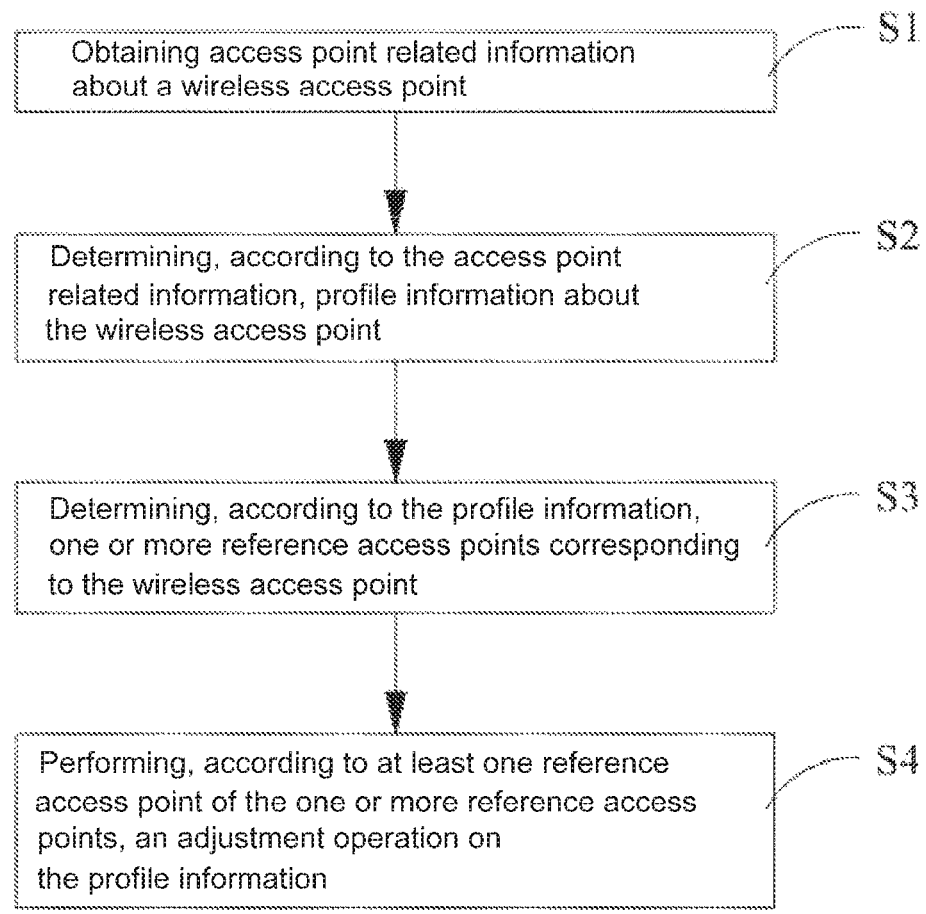
FIG. 5 shows a flowchart of a method for analyzing a profile of a wireless access point according to one embodiment of the present application.

With reference to FIG. 5, preferably, the method further comprises:

S3, determining, according to the profile information, one or more reference access points corresponding to the wireless access point; and S4, performing, according to at least one reference access point of the one or more reference access points, an adjustment operation on the profile information.

In this embodiment, in step S3, according to the profile information, one or more reference access points corresponding to the wireless access point are determined. In one embodiment, in step S3, according to specific conditions, and related information in the profile information about the wireless access point, a reference access point of the wireless access point may be determined. For example, accurate position information about the wireless access point may be determined according to profile label information corresponding to a terminal expansion attribute in the profile information about the wireless access point, and wireless access points within a certain distance of the position may be further determined as reference access points, etc., and an access point having the same SSID as the wireless access point may also serve as the reference access point, etc.

Here, in one embodiment the method in step S3 for determining one or more reference access points corresponding to the wireless access point according to the profile information is merely exemplary, and the other existing or future methods to determine one or more reference access points corresponding to the wireless access point according to the profile information, which may appear in the future, may also be included in the scope of protection of the present application as applicable to the present application and are hereby incorporated by reference.

In this embodiment, in step S4, according to at least one reference access point of the one or more reference access points, an adjustment operation is performed on the profile information. In one embodiment, according to related information about the reference access point(s) of the wireless access point, the profile of the wireless access point may be enriched, and to serve as a distance rather than limitation, provider information about the wireless access point may be supplemented according to provider related information about the wireless access point(s); and In one embodiment, an associated adjustment operation may be performed on the provider information about the wireless access point according to the provider information about the reference access point(s) of the wireless access point through the fact that provider information corresponding to wireless access points which are close in position and distance may also be similar or the same. Certainly, in step S4, according to other related information about the reference access point(s), the profile information about the wireless access point may further be enriched, which will not be taken as examples one by one.

Continuing in this embodiment, in step S4, the specific method for performing an adjustment operation on the profile information may be newly adding profile information about the wireless access point. For example, when the wireless access point profile information lacks the provider information, the provider information about a reference access point near the position of the wireless access point may serve as the provider information about the wireless access point, so as to further add a provider attribute type corresponding to the provider information to the profile information about the wireless access point; the method may also be modifying the profile information about the wireless access point, for example, when the profile information about the wireless access point changes, an adjustment operation of modification or update, etc. needs to be performed on the profile information about the wireless access point; and the method may further comprise adding provider scale information about the wireless access point according to the quantity information about the reference access points of the wireless access point, and here, the provider scale information about the wireless access point may be obtained by counting quantity information about access points having the same SSID as the wireless access point, i.e., reference access points, and the information is added to the profile information about the wireless access point.

Here, in one embodiment the method in step S4 for performing an adjustment operation on the profile information according to at least one reference access point of the one or more reference access points is merely exemplary, and the other existing or future methods to perform an adjustment operation on the profile information according to at least one reference access point of the one or more reference access points, which may appear in the future, may also be included in the scope of protection of the present application as applicable to the present application and are hereby incorporated by reference.

Preferably, the adjustment operation comprises at least any one of:

newly adding information contents in the profile information according to reference profile information about the at least one reference access point;

modifying original information contents in the profile information according to the reference profile information about the at least one reference access point; and newly adding provider scale information corresponding to the wireless access point in the profile information according to quantity information about the at least one reference access point.

In this embodiment, the adjustment operation may comprise newly adding information contents in the profile information according to reference profile information about the at least one reference access point. In one embodiment, newly adding information contents in the profile information is generally newly adding contents which have not appeared in the wireless access point profile information, and at this time the newly added information contents supplement the profile information about the wireless access point, so that the profile information about the wireless access point is richer. Please refer to the aforementioned embodiments for the examples of newly adding profile information contents, which will not be described herein.

Continuing in this embodiment, the adjustment operation may further comprise newly modifying the original information contents in the profile information according to reference profile information about the at least one reference access point. In one embodiment, modifying the original information contents in the profile information is generally the case where the profile information about the wireless access point changes, for example, in the case where the profile information about the wireless access point changes, an adjustment operation of modification or update, etc. needs to be performed on the profile information about the wireless access point; and at this time, the profile information about the wireless access point needs to be modified or updated in a targeted manner, so as to ensure that the profile information about the wireless access point represents current feature information about the wireless access point and is more accurate and trustable.

Continuing in this embodiment, the adjustment operation may further comprise newly adding provider scale information corresponding to the wireless access point to the profile information according to the quantity information about the at least one reference access point, which may be adding the provider scale information about the wireless access point according to the quantity information about the reference access points of the wireless access point. Here, the provider scale information about the wireless access point may be obtained by counting quantity information about access points having the same SSID as the wireless access point, i.e., reference access points, and the information is added to the profile information about the wireless access point, so as to enrich the profile information about the wireless access point.

Preferably, step S2 comprises:

S21 (not shown), determining, according to the access point related information, one or more reference access points corresponding to the wireless access point; and S22 (not shown), determining, according to the reference profile information about at least one reference access point of the one or more reference access points, profile information about the wireless access point.

In this embodiment, in step S21, according to the access point related information, one or more reference access points corresponding to the wireless access point are determined. In one embodiment, according to specific conditions, and related information in the profile information about the wireless access point, a reference access point of the wireless access point may be determined. For example, accurate position information about the wireless access point may be determined according to profile label information corresponding to a terminal expansion attribute in the profile information about the wireless access point, and wireless access points within a certain distance of the position may be further determined as reference access points, etc., and an access point having the same SSID as the wireless access point may also serve as the reference access point, etc.

Here, in one embodiment the method in step S21 for determining one or more reference access points corresponding to the wireless access point according to the profile information is merely exemplary, and the other existing or future methods to determine one or more reference access points corresponding to the wireless access point according to the profile information, which may appear in the future, may also be included in the scope of protection of the present application as applicable to the present application and are hereby incorporated by reference.

Continuing in this embodiment, in step S22, according to the reference profile information about at least one reference access point of the one or more reference access points, profile information about the wireless access point is determined. In one embodiment, the method for determining the profile information about the wireless access point according to the profile information about the reference access point determined in step S22 may be directly matching the profile information about the reference access point as the profile information about the wireless access point. This case is mainly targeted at the situation where the similarity between the reference access point and the wireless access point is relatively high, for example, the profile information between wireless access points having the same SSID within a certain distance range may be matched with each other, etc.; also, certain information in the profile information about the reference access point may serve as a supplement of the profile information about the wireless access point. This case is mainly targeted at the situation where the profile information in the wireless access point is not so perfect and corresponding information about the profile information about the reference access point needs to be supplemented. For example, provider type information about access points within a certain distance range of the wireless access point may be used to supplement provider type information in the profile information about the wireless access point, etc.; and also, certain information in the profile information about the reference access point may serve as a basis for modifying or updating the original profile information about the wireless access point.

In addition, in step S22, the profile information about the wireless access point may further be newly added by performing processing of statistics, matching, etc. on the related data of the reference access point of the wireless access point. For example, the provider scale information about the wireless access point may be obtained by counting quantity information about access points having the same SSID as the wireless access point, i.e., reference access points, and the information is added to the profile information about the wireless access point, so as to enrich the profile information about the wireless access point, etc.

In an embodiment, the reference access point satisfies at least any one of the conditions of:

the distance between the reference access point and the wireless access point being less than a pre-determined access point distance threshold value;

the matching degree between an adjacent access point of the reference access point and an adjacent access point of the wireless access point exceeding a pre-determined adjacent access point matching threshold value;

the SSID matching degree between the reference access point and the wireless access point exceeding a pre-determined identifier matching threshold value;

access frequency information about the same user equipment accessing the reference access point and the wireless access point exceeding a pre-determined common user number threshold value;

different user equipment accessing the reference access point and the wireless access point, and a matching degree between user profile information about users corresponding to different user equipment exceeds a pre-set user profile information matching threshold value.

In this embodiment, the reference access point may satisfy: the distance between the reference access point and the wireless access point being less than a pre-determined access point distance threshold value; In one embodiment, with regard to the distance information between the reference access point and the wireless access point, the distance information between the reference access point and the wireless access point may be calculated after position information between the reference access point and the wireless access point is determined, Moreover, the position information about the reference access point and that of the wireless access point may be respectively obtained directly by means of position information about a corresponding access point in the profile information about the reference access point and that of the wireless access point, and the position information about the two may also be obtained respectively by means of a terminal accessing the reference access point and the wireless access point. Furthermore, accurate position information about the wireless access point is determined by means of GPS positioning of the terminal and the signal strength of the corresponding wireless access point, etc., and the distance threshold value needs to be set according to specific conditions. For example, the passenger flow volume near the wireless access point and the distribution density of wireless access points, etc. may be taken into consideration. The threshold value should not be too great to avoid too many reference access points of the wireless access point, which may thus affect the accuracy of profile information about the wireless access point; and the threshold value should also not be too small to avoid being unable to find a reference access point of the wireless access point, such that the objective of enriching the profile information about the wireless access point via profile information about the reference access point cannot be achieved.

Continuing in this embodiment, the reference access point may satisfy: the matching degree between an adjacent access point of the reference access point and an adjacent access point of the wireless access point exceeding a pre-determined adjacent access point matching threshold value; and In one embodiment, an adjacent access point of the reference access point and an adjacent access point of the wireless access point may both be judged and determined according to position information about an access point, and please refer to the aforementioned embodiments for the specific implementation method for obtaining the position information about the wireless access point and calculating the distance between access points according to the position information, which will not be described herein. Here, the matching degree between adjacent access points respectively corresponding to the reference access point and the wireless access point may be the matching degree of profile information about the adjacent access points, and the setting of the threshold value also needs to be decided according to specific conditions, and the setting principle thereof is similar to the setting principle of the distance threshold value above, which will not be described herein.

Continuing in this embodiment, the reference access point may satisfy: an SSID matching degree between the reference access point and the wireless access point exceeding a pre-determined identifier matching threshold value; and In one embodiment, when an SSID matching degree of the wireless access points is relatively high, it represents, to some extent, that providers of these wireless access points may possibly be the same, for example, if the SSIDs of the wireless access points are all called "Starbucks Coffee" or some are "Starbucks" while some are "Starbucks Coffee", then it is of great possibility that the providers of these wireless access points are all Starbucks Coffee Store. Here, the setting of an identification matching threshold value may take the situations of the length of SSID, whether a key identification content is comprised, etc. into consideration. For example, if the SSID of a wireless access point is "Starbucks Coffee", then it may be the case where "Starbucks" therein is a key content of a provider commercial tenant name, while "Coffee" is a provider type key content, etc.

Continuing in this embodiment, the reference access point may satisfy: access frequency information about the same user equipment accessing the reference access point and the wireless access point exceeding a pre-determined common user number threshold value; In one embodiment, the same user equipment which accesses the reference access point and the wireless access point is common user equipment of the reference access point and the wireless access point; and frequency information that the same user equipment accesses the reference access point and the wireless access point may represent, to some extent, the number of common users of the reference access point and the wireless access point. For this reason, when the frequency information that the same user equipment accesses the reference access point and the wireless access point exceeds a threshold value of the number of common users of the reference access point and the wireless access point, the profile information about the corresponding reference access point may then serve as reference profile information about the wireless access point, so as to enrich the profile information about the wireless access point. Furthermore, access frequency information that the same user equipment accesses the reference access point and the wireless access point may be obtained via a historical record that the user equipment accesses the wireless access point, and may also be obtained via log record information that the wireless access point is accessed, etc., and the setting of the threshold value of the number of common users also needs to be decided according to specific conditions, and the setting principle thereof is similar to the setting principle of the distance threshold value and matching threshold value above, which will not be described herein.

Continuing in this embodiment, the reference access point may satisfy: different user equipment accessing the reference access point and the wireless access point, and the matching degree between pieces of user profile information about users corresponding to different user equipment exceeds a pre-set user profile information matching threshold value, and the user profile information is information representing various features of a user, for example, information about the user's character, specialty, interest and hobby, etc., and when the matching degree of different pieces of user profile information exceeds a certain pre-set threshold value, it represents, to some extent, that users corresponding to the different user profiles have many identical features, for example, having the same interest and hobby, specialty, etc., then furthermore, the users having many identical features may also have some similarity in wireless access points accessed by a user equipment. In one embodiment, when the interests of different users with the matching degree of user profile information exceeding a certain threshold value are similar, the different users may generally access wireless access points having similar features, and at this time, other wireless access points accessed by the different users with the matching degree of profile information exceeding a certain threshold value may be taken as reference access points, and the overall features of these reference access points are used for enriching the profile information about the wireless access point. For example, if a user A and a user B both prefer delicious food, and providers of wireless access points accessed thereby being delicious food or associated with delicious food will be more when the matching degree of user profile information about the two exceeds a certain matching degree threshold value, then from the perspective of the wireless access points accessed by the user A and the user B being both basically wireless access points associated with delicious food, the wireless access points in the access historical record of the two may be taken as reference access points, and the overall feature, i.e., the access point related information "the provider being a food and beverage commercial tenant", is used for enriching the profile information about the wireless access point. The setting of the matching threshold value of the user profile information also needs to be decided according to specific conditions, and the setting principle thereof is similar to the setting principle of the distance threshold value, adjacent access point matching threshold value and threshold value of number of common users above, which will not be described herein.

Preferably, if the reference access point satisfies the condition of different user equipment accessing the reference access point and the wireless access point, and the matching degree between pieces of user profile information about users corresponding to the different user equipment exceeds a pre-set user profile information matching threshold value, step S22 comprises:

determining, according to reference profile information about the reference access point which satisfies the condition, profile information about the wireless access point.

In one embodiment, please refer to corresponding description in the aforementioned embodiments for the specific implementation of satisfying conditions of the reference access point, which will not be described herein. In step S22, according to reference profile information about the reference access point which satisfies the aforementioned condition, profile information about the wireless access point is determined. In one embodiment, when the interests of different users with the matching degree of user profile information exceeding a certain threshold value are similar, the different users may generally access wireless access points having similar features, and at this time, other wireless access points accessed by the different users with the matching degree of profile information exceeding a certain threshold value may be taken as reference access points, and in step S22, the overall features of these reference access points may be used for enriching the profile information about the wireless access point. For example, if a user A and a user B both prefer delicious food, and providers of wireless access points accessed thereby being delicious food or associated with delicious food will be more when the matching degree of user profile information about the two exceeds a certain matching degree threshold value, then from the perspective of the wireless access points accessed by the user A and the user B being both basically wireless access points associated with delicious food, the wireless access points in the access historical record of the two may be taken as reference access points, and the overall feature, i.e., the access point related information "the provider being a food and beverage commercial tenant", is used for enriching the profile information about the wireless access point.

Here, in one embodiment the method in step S22 for determining profile information about the wireless access point according to the reference profile information about at least one reference access point of the one or more reference access points is merely exemplary, and the other existing or future methods to determine profile information about the wireless access point according to the reference profile information about at least one reference access point of the one or more reference access points, which may appear in the future, may also be included in the scope of protection of the present application as applicable to the present application and are hereby incorporated by reference.

Figure 6:
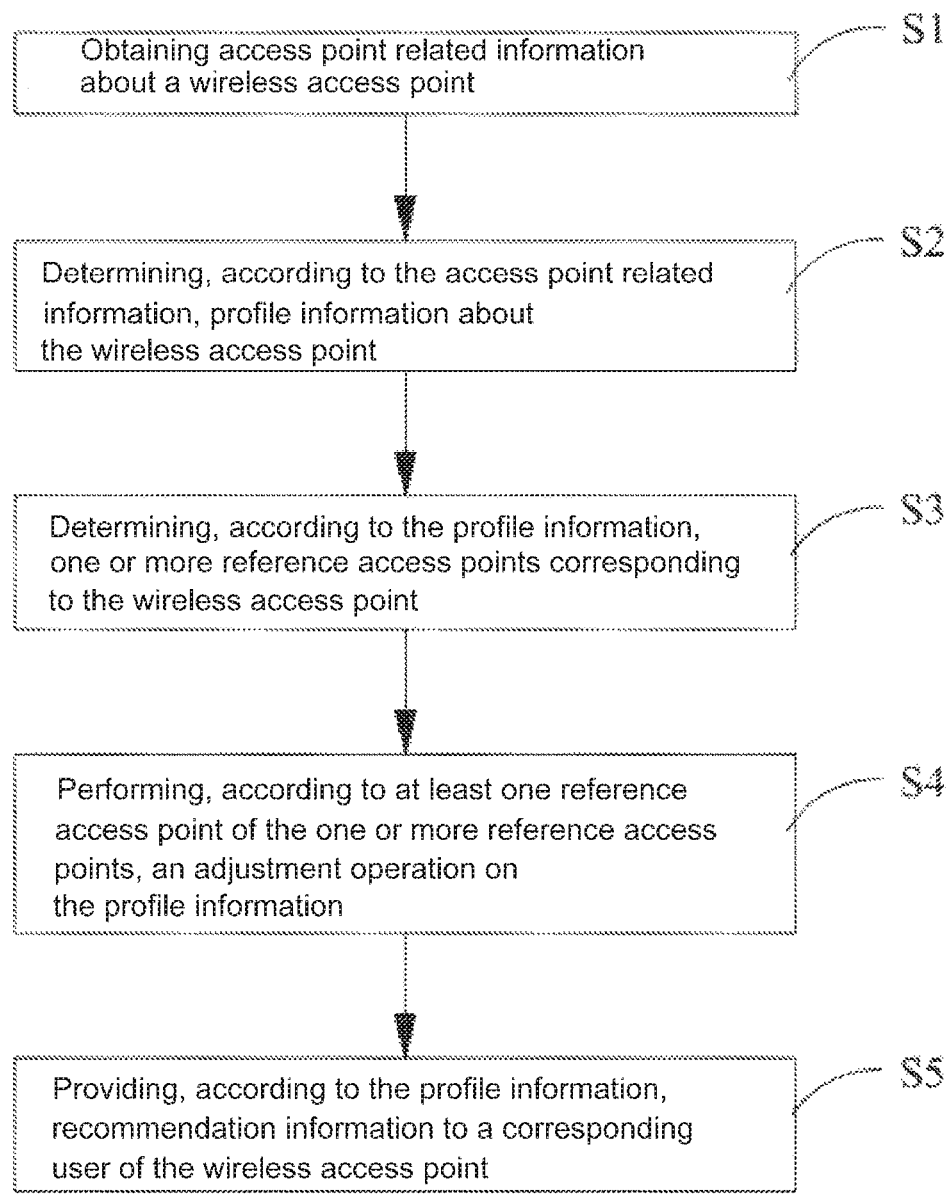
FIG. 6 shows a flowchart of a method for analyzing a profile of a wireless access point according to another embodiment of the present application.

With reference to FIG. 6, in an embodiment, the method further comprises:

S5, providing, according to the profile information, recommendation information to a corresponding user of the wireless access point.

In this embodiment, in step S5, according to the profile information, recommendation information is provided to a corresponding user of the wireless access point. In one embodiment, in the overall process starting from a user sending the wish of accessing a network via the wireless access point, until the user is in a state where the network is accessed via the wireless access point, information may be recommended to the user according to the profile information about the wireless access point, and the information recommended thereby may be directly from the profile information about the wireless access point, and may also be information obtained according to statistics and matching of related information in the associated wireless access point profile information, for example, by counting information about the number of wireless access points having the same SSID, scale conditions information about the commercial tenant, etc. that may be recommended to the user.

Continuing in this embodiment, furthermore, when the user chooses a wireless access point to access the network, in step S5, according to specific usage scenarios of the user, such as Internet banking payment, video watching, etc., as well as connection attribute information in the profile information about the wireless access point, the most appropriate wireless access point may be recommended to the user, for example, it may be correspondingly a wireless access point with a relatively high security level, with a relatively broad bandwidth, etc. After the user accesses the network via the wireless access point, according to provider related information in the profile information about the wireless access point accessed by the user, related information may be recommended to the user, for example, when the provider of the wireless access point is a commercial tenant, commodity/service information about the commercial tenant as well as discount information thereabout may be recommended to the user; and when the provider of the wireless access point is a station or a library, information about layout conditions, medical center positions, etc. of the place may be recommended to the user.

Preferably, step S5 comprises:

S51 (not shown), if the profile information comprises historical connection attribute information about the wireless access point, providing the historical connection attribute information to a user who is to establish a wireless connection; or S52 (not shown), if the profile information comprises provider attribute information corresponding to the wireless access point, providing the provider attribute information or recommendation information matching the provider attribute information to a user who accesses the wireless access point.

In this embodiment, if the profile information comprises historical connection attribute information about the wireless access point, in step S51, the historical connection attribute information is provided for a user who is to establish a wireless connection. In one embodiment, the historical connection attribute information which may be provided to the user may generally comprise information about the access security, connection success rate, scanning connection ratio, available bandwidth, connection related complaint conditions, etc. of the wireless access point, and the user may choose an appropriate or the best wireless access point according to these pieces of information and further access the network; furthermore, when the user chooses a wireless access point to access the network, according to specific usage scenarios of the user, such as Internet banking payment, video watching, etc., as well as connection attribute information in the profile information about the wireless access point, the most appropriate wireless access point may be recommended to the user, for example, it may be correspondingly a wireless access point with a relatively high security level, with a relatively broad bandwidth, etc.

Continuing in this embodiment, if the profile information comprises provider attribute information corresponding to the wireless access point, in step S52, the provider attribute information or recommendation information matching the provider attribute information is provided to a user who accesses the wireless access point. In one embodiment, according to provider related information in the profile information about the wireless access point accessed by the user, related information may be recommended to the user, for example, when the provider of the wireless access point is a commercial tenant, commodity/service information about the commercial tenant as well as discount information thereabout may be recommended to the user; and when the provider of the wireless access point is a station or a library, information about layout conditions, medical center positions, etc. of the place may be recommended to the user.

More preferably, the recommendation information matching the provider attribute information comprises at least any one of:

position information about a provider corresponding to the wireless access point;

service information matching the type of the provider;

service or product information about the provider; and feedback information about a service or product of the provider.

In one embodiment, the recommendation information matching the provider attribute information may comprise position information about a provider corresponding to the wireless access point, and the position information may be specific position information about the provider, may also be position information about the provider with reference to a certain famous landmark, and may also be path information for arriving at the position of the provider, etc.

In one embodiment, the recommendation information matching the provider attribute information may also comprise service information matching the type of the provider, and the type of the provider may comprise commercial tenants of food and beverage, clothes, entertainment, etc., public places of a station, a library, etc., office places of an office building, etc.; and the service information matching these provider types above generally comprises service information about parking, discount, delivery to home or not, etc. of a commercial tenant, service information about functional department layout conditions, information center, emergency medical center, etc. of public places of a station, a library, etc.

In one embodiment, the recommendation information matching the provider attribute information may also comprise service or product information about the provider, and the service or product information about the provider is generally discount activities of a product/service thereof, information about a new arrival product/service, etc., that may be recommended to a user in the case where the provider is a commercial tenant.

In one embodiment, the recommendation information matching the provider attribute information may also comprise feedback information about a service or product of the provider, and the feedback information about the service or product of the provider is generally also feedback and comment information, from a user who has purchased/ experienced the product/service of the provider, about the purchased/experienced product/service in the case where the provider is a commercial tenant, since these information has some reference values for other users who wish to purchase/ experience the product/service of the provider. These information may be recommended to users.

In comparison to the prior art, the present application comprises: determining, according to access point related information, profile information about a wireless access point, by obtaining the access point related information about the wireless access point, such as historical connection related information about the wireless access point and provider related information about the wireless access point, so that the wireless access point establishes its own profile using various types of information associated therewith, thereby greatly enriching the information about the wireless access point, providing a better experience for a user of the wireless access point, and also providing a basis and premise for further associated application based on the profile information about the wireless access point at the same time. For example, discount information about a commodity, service, etc. of the provider in the profile information about the wireless access point can be provided to a user who accesses the wireless access point; and wireless access points having the same characteristics can be counted by means of big data processing according to the profile information about the wireless access point.

Moreover, in the present application, an access point closer to a wireless access point, an access point having a higher SSID matching degree of the wireless access point, etc. can be taken as a reference wireless access point via information about the reference access point of the wireless access point; and the profile information about the wireless access point is adjusted, such as newly adding information contents in the profile information, modifying original information contents of the profile information, etc.; therefore, the profile information about the wireless access point is supplemented, making the profile information about the wireless access point more perfect, and further improving the experience of the user accessing the wireless access point.

In addition, the present application may further comprise: providing recommendation information to a corresponding user of a wireless access point according to profile information about the wireless access point, which may comprise providing historical connection attribute information about the wireless access point to a user who is to establish a wireless connection, for example, connection success rate information, connection-scanning ratio information, etc., about the wireless access point; this may also comprise providing the provider attribute information or recommendation information matching the provider attribute information to a user who accesses the wireless access point, such as position information about the wireless access point provider, service information matching the type of the provider, service or product information about the provider, feedback information about a service or product of the provider, etc.; and therefore, the experience of a user accessing a wireless access point is improved, and diversified requirements when the user accesses the wireless access point are satisfied.

In one embodiment, it is apparent that the present invention is not limited to the details of the above-mentioned exemplary embodiments, and the present invention can be implemented in other specific forms without departing from the spirit or basic features of the present invention. Therefore, no matter from which point of view, the embodiments should all be regarded as exemplary and non-limiting. The scope of the present invention is defined by the appended claims rather than the above-mentioned description, and therefore it is intended that all changes which fall within the meaning and range of equivalency of the claims are embraced in the present invention. Any reference signs in the claims should not be construed as limiting the claims involved. In addition, it is apparent that the word "comprising" does not exclude other elements or steps, and the singular does not exclude the plural. A plurality of devices or means stated in the device claims may also be implemented by one device or means by means of software or hardware. The terms first and second and the like are used to represent names and do not represent any particular order.

What is claimed is:

1. A method for analyzing a profile of a wireless access point, comprising:
    obtaining access point related information about a wireless access point;
    determining, according to the access point related information, profile information about the wireless access point, including:
    determining, according to the access point related information and in combination with an attribute type corresponding to the access point related information, profile information about the wireless access point, wherein the profile information comprises profile label information corresponding to the attribute type; and
    if the attribute type corresponding to the access point related information comprises the terminal expansion attribute corresponding to the wireless access point, determining, according to the access point related information, position information about the wireless access point as profile label information corresponding to the terminal expansion attribute.

2. The method according to claim 1, wherein the attribute type comprises at least one selected from the group consisting of:
    a terminal expansion attribute corresponding to the wireless access point;
    a provider attribute corresponding to the wireless access point;
    a historical connection attribute of the wireless access point;
    other attributes of the wireless access point.

3. The method according to claim 2, wherein if the attribute type corresponding to the access point related information comprises the historical connection attribute of the wireless access point, the profile label information corresponding to the historical connection attribute comprises at least one selected from the group consisting of:
    connection success rate information about the wireless access point;
    connection-scanning ratio information about the wireless access point.

4. The method according to claim 1, further comprising:
    determining, according to the profile information, one or more reference access points corresponding to the wireless access point;
    performing, according to at least one reference access point of the one or more reference access points, an adjustment operation on the profile information.

5. The method according to claim 4, wherein the adjustment operation comprises at least one selected from the group consisting of:
    newly adding information contents in the profile information according to reference profile information about the at least one reference access point;
    modifying original information contents in the profile information according to the reference profile information about the at least one reference access point;
    newly adding provider scale information corresponding to the wireless access point in the profile information according to quantity information about the at least one reference access point.

6. The method according to claim 1, wherein the step of determining, according to the access point related information, profile information about the wireless access point comprises:
    determining, according to the access point related information, one or more reference access points corresponding to the wireless access point;
    determining, according to the reference profile information about at least one reference access point of the one or more reference access points, profile information about the wireless access point.

7. The method according to claim 6, wherein the reference access point satisfies at least one of the conditions of:
    the distance between the reference access point and the wireless access point being less than a pre-determined access point distance threshold value;
    a matching degree between an adjacent access point of the reference access point and an adjacent access point of the wireless access point exceeding a pre-determined adjacent access point matching threshold value;
    an SSID matching degree between the reference access point and the wireless access point exceeding a pre-determined identifier matching threshold value;
    access frequency information about the same user equipment accessing the reference access point and the wireless access point exceeding a pre-determined common user number threshold value;
    different user equipments, which satisfy a condition that a matching degree between user profile information about users corresponding to the different user equipments exceeds a pre-set user profile information matching threshold value, accessing the reference access point and the wireless access point.

8. The method according to claim 7, wherein if the reference access point satisfies the condition of different user equipments, which satisfy a condition that a matching degree between user profile information about users corresponding to the different user equipments exceeds a pre-set user profile information matching threshold value, accessing the reference access point and the wireless access point,
    the step of determining, according to the reference profile information about at least one reference access point of the one or more reference access points, profile information about the wireless access point comprises:
    determining, according to reference profile information about the reference access point which satisfies the condition, profile information about the wireless access point.

9. The method according to claim 1, further comprising:
providing, according to the profile information, recommendation information to a corresponding user of the wireless access point.

10. The method according to claim 9, wherein the step of providing, according to the profile information, recommendation information to a corresponding user of the wireless access point comprises:
if the profile information comprises historical connection attribute information about the wireless access point, providing the historical connection attribute information to a user who is to establish a wireless connection; or
if the profile information comprises provider attribute information corresponding to the wireless access point, providing the provider attribute information or recommendation information matching the provider attribute information to a user who accesses the wireless access point.

11. The method according to claim 10, wherein the recommendation information matching the provider attribute information comprises at least any one selected from the group consisting of:
position information about a provider corresponding to the wireless access point;
service information matching the type of the provider;
service or product information about the provider;
feedback information about a service or product of the provider.

12. A non-transitory computer-readable medium storing instructions, which when executed by one or more processors, cause an apparatus at least to:
acquire one or more wireless access points corresponding to target location information;
obtain access point related information about a wireless access point;
determine, according to the access point related information, profile information about the wireless access point, including:
determine, according to the access point related information and in combination with an attribute type corresponding to the access point related information, profile information about the wireless access point, wherein the profile information comprises profile label information corresponding to the attribute type; and
if the attribute type corresponding to the access point related information comprises the terminal expansion attribute corresponding to the wireless access point, determine, according to the access point related information, position information about the wireless access point as profile label information corresponding to the terminal expansion attribute.

13. An apparatus, comprising:
a memory; and
one or more processors executing instructions stored in the memory to cause the apparatus to:
obtain access point related information about a wireless access point;
determine, according to the access point related information, profile information about the wireless access point, including:
determine, according to the access point related information and in combination with an attribute type corresponding to the access point related information, profile information about the wireless access point, wherein the profile information comprises profile label information corresponding to the attribute type; and
if the attribute type corresponding to the access point related information comprises the terminal expansion attribute corresponding to the wireless access point, determine, according to the access point related information, position information about the wireless access point as profile label information corresponding to the terminal expansion attribute.

* * * * *